United States Patent [19]

Kennedy

[11] Patent Number: 5,675,818
[45] Date of Patent: Oct. 7, 1997

[54] SYSTEM AND METHODS FOR IMPROVED SORTING WITH NATIONAL LANGUAGE SUPPORT

[75] Inventor: Robin David Kennedy, Scotts Valley, Calif.

[73] Assignee: Borland International, Inc., Scotts Valley, Calif.

[21] Appl. No.: 490,364

[22] Filed: Jun. 12, 1995

[51] Int. Cl.[6] .............................. G06F 17/30; G06F 17/28
[52] U.S. Cl. ........................ 395/758; 395/798; 395/607
[58] Field of Search .................................. 395/758, 798, 395/607, 606

[56] References Cited

U.S. PATENT DOCUMENTS

| | | | |
|---|---|---|---|
| 4,615,002 | 9/1986 | Innes | 395/758 |
| 4,939,639 | 7/1990 | Lee et al. | 395/800 |
| 5,060,146 | 10/1991 | Chang et al. | 395/607 |
| 5,072,386 | 12/1991 | Garneau et al. | 395/758 |
| 5,148,541 | 9/1992 | Lee et al. | 395/602 |
| 5,440,482 | 8/1995 | Davis | 395/606 |
| 5,485,373 | 1/1996 | Davis et al. | 395/798 |
| 5,551,018 | 8/1996 | Hansen | 395/607 |
| 5,615,366 | 3/1997 | Hansen | 395/607 |

OTHER PUBLICATIONS

Hall, W., *Adapt Your Program for Worldwide Use with Windows Internationalization Support*, Microsoft Systems Journal, Nov./Dec. 1991, pp. 29–58.

*Primary Examiner*—Gail O. Hayes
*Assistant Examiner*—Joseph Thomas
*Attorney, Agent, or Firm*—John A. Smart

[57] ABSTRACT

A Database Management System having a Collation Engine with improved methods for sorting information with National Language Support (NLS) is described. The Collation Engine includes an improved method for comparing text strings with a culturally predictable result. In an exemplary embodiment, the Collation Engine includes a Collation Table storing primary, secondary, and tertiary weightings. The weightings are employed, in a method of the present invention, for accounting for locale-dependent factors or rules other than those taken into account by conventional primary and secondary weightings. Additional rules include, for instance, local-specific sorting rules specifying that the case of a character be taken into consideration, or that the expansion of an expanding character (e.g., "Æ" which expands to "AE") be taken into consideration. A preferred method for examining weightings is described, so that the system may uncover differences between characters which would otherwise be ignored by conventional systems. In this manner, comparison operations of text strings (e.g., during sorting) may be performed in a manner appropriate for a given locale (e.g., German DIN sorting rules).

20 Claims, 11 Drawing Sheets

SYSTEM AND METHODS FOR IMPROVED SORTING WITH NATIONAL LANGUAGE SUPPORT

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates in general to the field of data processing and, more particularly, to the accurate sorting of country-specific character sets according to country-specific sorting rules and standards.

For software publishers, overseas markets comprise an ever-growing percentage of revenues for all major PC applications. Traditionally, however, software products have been designed with little or no thought toward portability, let alone translating software products for overseas markets. As non-English speaking countries are buying more and more software from U.S. publishers, there is keen interest in improving the process of enabling or "internationalization," that is, designing and coding a software product so that it can be made to function for international use.

In the past, the process of providing National Language Support (i.e., accommodating a specific country's language, conventions, and culture) was done on a more or less ad hoc basis—essentially retrofitting software to accommodate a particular locale. Merely separating the text in a user interface from one's program is not an acceptable solution, however. Even after translating software prompts, help messages, and other textual information to the target languages, one still has to address basic issues of displaying and printing characters in the target language.

For instance, a target language will often include characters which are not defined by the default character set provided by the computer's operating system. IBM-compatible PCs running MS-DOS, for example, can display and print up to 256 different characters, the first 128 characters of which include the well-known 7-bit ASCII character set. This, of course, is not enough characters to support all languages. Some languages will obviously require a different character set; thus, sufficient means must be provided for switching character sets.

Other issues to consider when developing a system for foreign users include keyboard layout and various format conventions applicable for a particular country. Any use of currency, date, time, and the like within one's software must take into account these factors. For example, keyboards sold for European languages must include additional characters, such as letters with diacritics, and symbols, such as the British pound (£) sign.

Another potentially serious problem for localizing a program is the set of assumptions with which the underlying source code for the program was written. Assumptions made by English-speaking programmers, which were quite valid for the once-ubiquitous ASCII character set, often break down when dealing with a foreign language. For instance, the common programming technique of converting a character to uppercase by simply adding the number 32 to the character (numeric code) is often inappropriate for non-ASCII characters. Similarly, one cannot rely on standard C functions either. For instance, one cannot use simple string comparison functions like the C programming language's strcmp() function. Does an "ã" (i.e., an "a" with a diacritic) sort before or after a normal "a"?

One of the first serious attempts at providing National Language Support (NLS) for PCs was Microsoft's MS-DOS version 3.3. Since MS-DOS accommodates different sets of 256 characters for displaying and printing text, one may employ different characters by swapping in new character sets. Each such character set is referred to as a "code page"; the code page in use at any given time is called the "active code page." When installing operating system software, typically, a user may select a code page appropriate for his or her national language.

MS-DOS also includes an API (Application Programming Interface) having a variety of functions related to internationalization. Included are functions for inspecting code pages for determining and controlling how the keyboard, display, and printer handle characters. The API include functions, for instance, for inspecting and changing the current country code and obtaining information about the conventions associated with a current country code (e.g., how to display dates, currency, and the like).

Newer operating systems, such as later versions of MS-DOS and Microsoft Windows, support international sorting strings using language-independent tables. For an introduction of Microsoft Windows' internationalization support, see e.g., Hall, W., *Adapt Your Program for Worldwide Use with Windows Internationalization Support*, Microsoft Systems Journal, Vol 6, No. 6, November/December 1991, pp. 29–45, the disclosure of which is incorporated by reference herein.

The results obtained with the foregoing use of language-independent tables is rather limited, however. Specifically, the method employed for sorting characters uses the character's code point as a binary value. As such, the method is only suitable for a language having its code set in alphabetical order, such as the English language. International characters rarely appear in the code set in alphabetical order. Moreover, the traditional approach fails to process appropriately characters that are basically the same, or characters that represent a different number of characters (e.g., a character that expands into two characters for sorting).

One approach to sorting or collating text strings is to create binary keys for each string and then compare the keys. The approach, however, suffers from unacceptable overhead in processing time. Performance is particularly poor if the key is not stored for future comparisons but is, instead, recreated each time. An alternate approach is to use a table of binary values to represent each character. Each character's code point value (i.e., 0 to 255) points to what is basically a character weighting. The weightings of characters are then compared to resolve the sorting order. In this method, the weighting value is in two parts. One part represents a group of similar characters, the other part represents the character weighting within that group. This method can, therefore, overcome most of the deficiencies of the first method. Unfortunately, it is not sufficiently accurate to satisfy the standards of many countries.

Since sorting/collation methodology plays an important role in the operation of computers and other data processing systems, it is desirable to provide an improved collation engine employing collation methods which can be utilized by different character sets, yet preserves cultural requirements. The present invention fulfills this and other needs.

GLOSSARY

ASCII: American Standard Code for Information Interchange; a sequence of 128 standard characters.

Code page: A character set, such as available in MS-DOS versions 3.3 and later, that provides a table for relating the binary character codes used by a program to keys on a keyboard or to the appearance of characters on a display.

Database: An organized collection of information.

Database Management System (DBMS): System that controls the organization, storage, and retrieval of information in a database.

Enabling or Internationalization: Designing and coding a product so that it can be made to function for international use. A product is enabled if a national language version can be created at minimal expense and if it does not interfere with current or planned national language support of other products.

File: A collection of information stored under one name on a disk. For example, the system tables are stored in files.

Index: A file that determines an order in which the system can access the records in a table.

Localization: Translating and adding functions to an enabled product to accommodate a country's languages, conventions, and cultures.

National Language: A language or dialect spoken by any group of people.

National Language Support: The features of a product that accommodate a specific country, national language, local convention, culture, and the like.

National Language Version: A variant of an original product that implements National Language Support and is targeted to a particular market.

Primary Weight: Represents a first level of sorting based on characters of dissimilar families; for example, characters of the "A" family (i.e., "A", "a", "á", "ä", "ã", and the like) express a primary difference when compared to characters of the "B" family.

Secondary Weight: Represents a second level of sorting, usually based on diacritics of characters; for example, the "á" character expresses a secondary difference when compared to the "a" character.

Tertiary Weight: Represents a third level of sorting, usually based on the treatment of casing of characters; for example, the "A" character expresses a tertiary difference (for some locales) when compared to the "a" character.

Table: A structure made up of rows (records) and columns (fields) that contains information.

SUMMARY OF THE INVENTION

The present invention comprises a Database Management System having a Collation Engine with improved methods for collating information with internationalization support (i.e., National Language Support (NLS)). More particularly, the Collation Engine includes an improved method for comparing text strings with a culturally-predictable result.

In an exemplary embodiment, the Collation Engine includes a Collation Table, a Character Type Table, a One-to-two (1to2) Table, and a Two-to-one (2to1) Table. The Collation Table stores a primary weight, a secondary weight, a tertiary weight, and an ignore flag. The primary weight specifies a primary difference between two characters, such as the difference between the character "A" and the character "B". The secondary weight, a five-bit quantity, tracks the difference between similar characters, such as between "a" and "á". The tertiary weight, a two-bit quantity, tracks differences due to treatment of case, such as "A" compared to "a", or the Spanish "ch" compared to "cH" (or to "Ch", or to "CH").

The Character Type Table, besides specifying convention information (e.g., that a character is numeric), is enhanced to specify additional information. Specifically, the table also indicates whether a character is a one-to-two character (e.g., "æ"), whether a character could be the start of a two-to-one character (e.g., "c" in the Spanish "ch"), and whether a character is a special alphanumeric character (e.g., "_" for dBASE®).

The One-to-two (1to2) Table and the Two-to-one (2to1) Table store information specifying one-to-two character expansion and two-to-one character compression. The 2to1 Table, moreover, stores expansion rules for describing how a 2to1 character is to be expanded for a given locale, including whether the expanded character should be sorted before or after (i.e., before or after the corresponding expanded two characters).

The present invention includes methods employing these tables to perform character examination which takes into account other locale-dependent factors. A particular locale may specify additional rules, for instance, which specify that the case of a character be taken into consideration. Other rules may specify that the expansion of an expanding character (e.g., "Æ" which expands to "AE") be taken into consideration. In the system of the present invention, therefore, an examination of these differences is undertaken. In this manner, the invention may uncover a difference between the two characters (e.g., how each character "expands") which, although important to a particular locale, would otherwise be ignored by conventional systems.

Consider, for instance, the sorting of the following German words: Agäne, Agaene and Agaene. Both the "æ" and "ä" characters expand to "ae" for sorting. The locale rules for a German DIN sort specify that "æ" comes before "ä", and both expansions are set to come after "ae". Without observing expansion differences (i.e., applying just convention sorting methodology), upon the expansion of the characters to "ae", all three German words are equivalent—conventional methodology at this point would only know that characters have been expanded to "ae". Therefore, a conventional approach to sorting the three German words would yield a final sort order based on the natural order of the words (i.e., the order in which they are first received) since, after expansion, all three words would appear identical to a conventional collation engine.

The Collation Engine in the system of the present invention, in contrast, determines locale-important differences between the words. As before, the characters are expanded to "ae". However, this does not degenerate into a sort by natural order. Instead, each word includes an expansion to "ae" but also includes a weighting specifying the proper locale-specific sort order. In the system to the present invention, the words are then sorted according to their weightings, thus yielding the correct sort order (for a German DIN sort). Thus in this instance, the Collation Engine in the system of the present invention treats an expansion into two characters as a difference, for achieving the proper sort order.

The determination of weightings alone is not sufficient for determining the final sort order. Specifically, once the Collation Engine has determined that a difference exists, the engine must also determine the appropriate ordering (for the particular locale) for the expanded character. This is done by arranging the One-to-two (1to2) characters in the 1to2 Table according to the sort order for the locale. In this manner, the relative position of the 1to2 character in the 1to2 Table (i.e., its offset or index into the table) specifies the appropriate ordering for this character. Accordingly, the character "æ" is stored at a relative offset coming before "ä" (e.g., for a German DIN table). Further, both of these entries set a Before/After Flag, for indicating that these expanded characters should be sorted after the characters "ae".

By employing additional weightings, the Collation Engine of the present invention provides a method for comparing text strings (e.g., such as used during sorting) which yields results which do not compromise locale-specific rules, such as casing and expansion treatment. The system of the present invention yields a correct sort order in instances where two different one-to-two characters expand to the same characters (e.g., "á" and "æ"). Thus as a particular advantage, in the system of the present invention the rules employed for character expansion are defined on a character-by-character—they are not globally defined for all expansions. In this manner, sort operations of text strings having international characters may be performed in a manner appropriate for a given locale (e.g., German DIN sorting rules).

DETAILED DESCRIPTION OF A PREFERRED EMBODIMENT

For clarity, the following description will focus on an embodiment of the present invention operative in a database environment. Specifically, since most readers will have at least some exposure to database systems, it is helpful to describe the present invention as implemented in such systems. The present invention is, however, not limited to any particular exemplary embodiment. Instead, the teachings of the present invention may be advantageously applied to a variety of applications (e.g., spreadsheets, wordprocessors, CAD programs, and the like), operating on a variety of architectures (e.g., Macintosh, MS-DOS, Windows, NextStep, UNIX, and the like). Application of the principles of the present invention is particularly advantageous in those systems where locale-dependent information is sorted internationally. Therefore, the following preferred embodiment and certain alternatives are offered for purposes of illustration and not limitation.

General Architecture

Figure 1A:
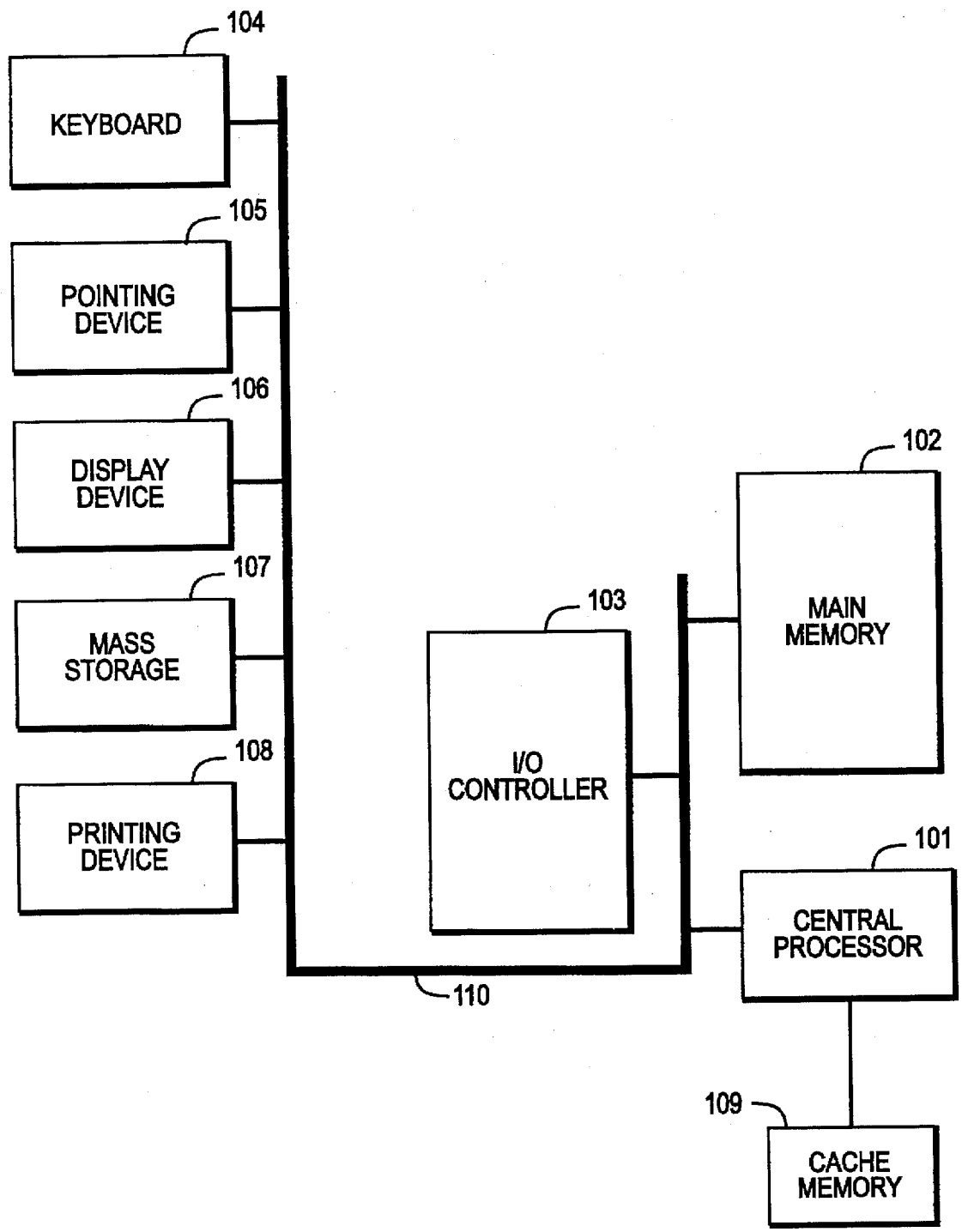
FIG. 1A is a block diagram of a computer system in which the present invention may be embodied.

The present invention may be embodied on a computer system such as the system 100 of FIG. 1A, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
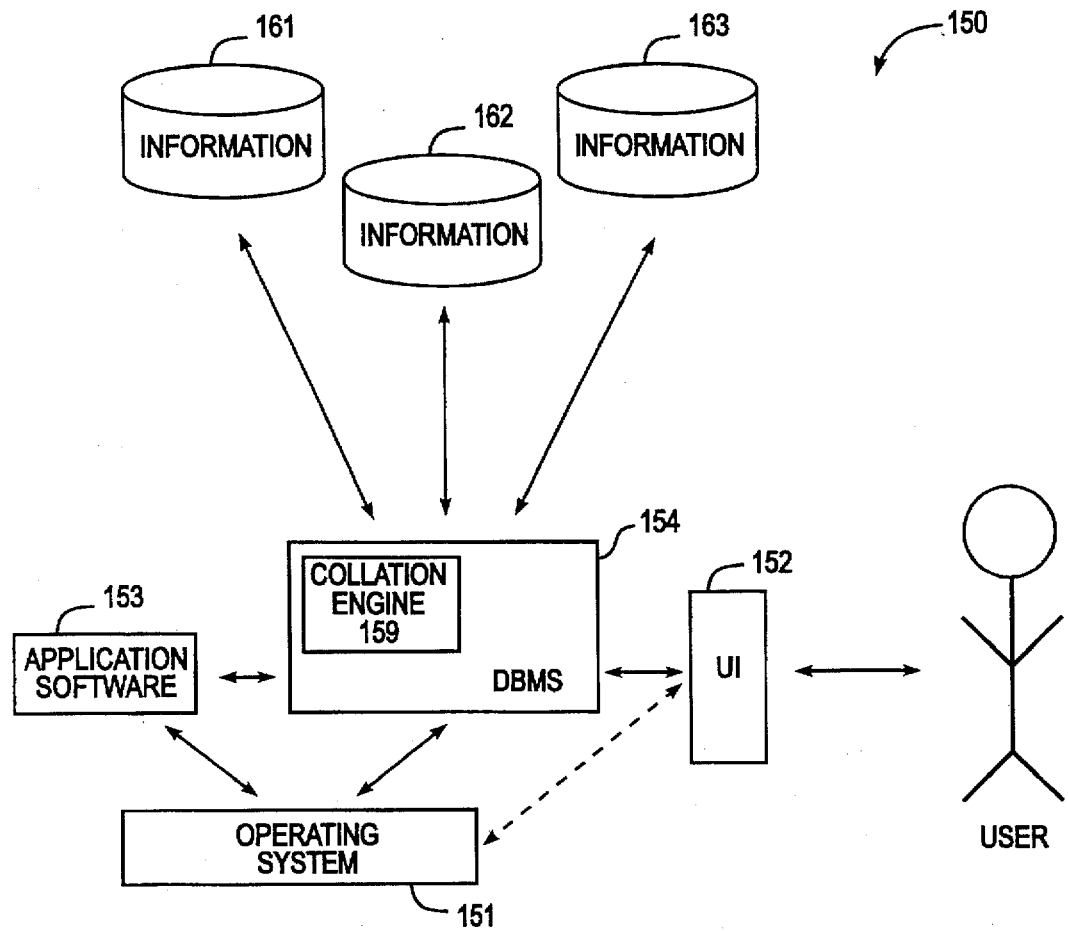
FIG. 1B is a block diagram of a software system for controlling the operation of the computer of FIG. 1A, the software system including a database management system (DBMS) having a Collation Engine of the present invention.

Illustrated in FIG. 1B, a computer software system 150 is provided for programming the operation of the computer system 100. Software system 150, which is stored in system memory 102 and on disk memory 107, includes a kernel or operating system 151 and a database management system (DBMS) 154. OS 151 is the executive or supervisor for the system 100, directing both task management and data management.

DBMS 154, on the other hand, is a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154. As shown, DBMS 154 also includes a Collation Engine 159 of the present invention; specific methods of the engine are described in further detail hereinbelow.

In a preferred embodiment, the system 100 is an IBM-compatible personal computer system, available from a variety of vendors (including IBM of Armonk, N.Y.), and operating system 151 is MS-DOS operating system software, available from Microsoft of Redmond, Wash. DBMS 154 is preferably a PC database management system (PC DBMS). More preferably, DBMS 154 includes dBASE® Database Management System (available from Borland International of Scotts Valley, Calif.). As interface 152, dBASE provides a worksurface or "canvas" and command menus; a QBE query worksurface is also provided. Application software 153, in turn, includes database command-language applications (e.g., dBASE®-created applications), which may be executed or otherwise acted upon by the DBMS 154. For further description of the general operation of dBASE, the reader should refer to dBASE IV manuals: *Getting Started, Using dBASE IV, Language Reference,* and *Programming in dBASE IV,* all available from Borland International, and the disclosures of which are hereby incorporated by reference.

Figure 1C:
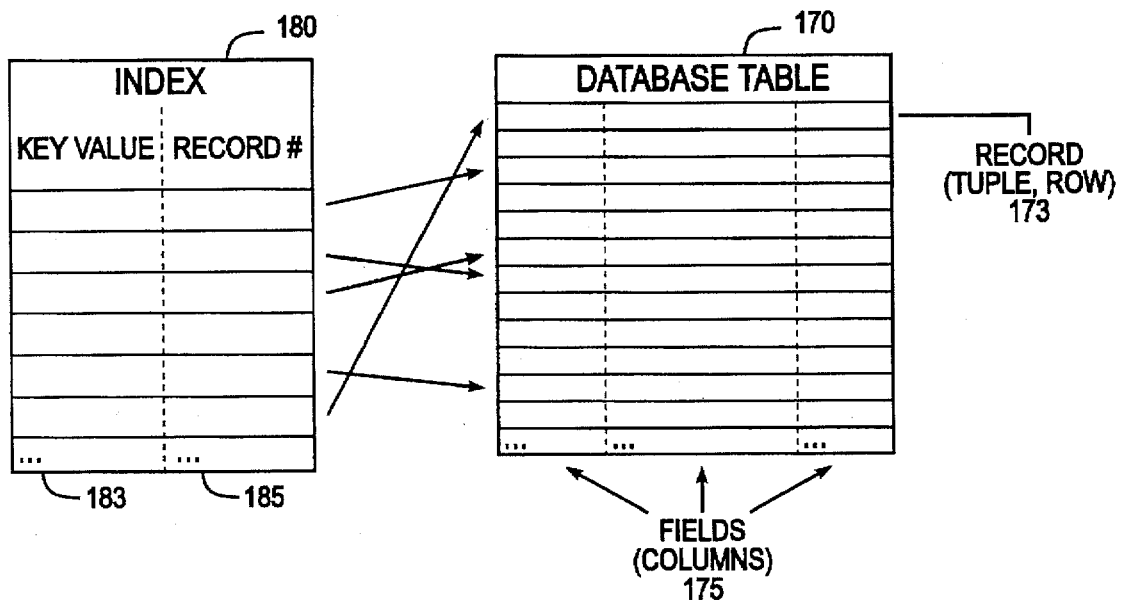
FIG. 1C is a block diagram illustrating the relationship between an index file and a database table.

In a relational database management system, information is organized into tables, such as table 170 of FIG. 1C. As conceptually shown, table 170 typically includes horizontal rows or records (tuples) 173 and vertical columns or fields 175. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

By employing one or more database indexes, the records of a table can be organized in many different ways, depending on a particular user's needs. As shown by index 180 of FIG. 1C, for example, an index may be constructed as a single disk file; the index is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (i.e., sorted on an index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically, not physically) the records in a database file according to the values in one or more fields of interest. As such, an index may greatly speed up searching (querying) for and sorting of information.

A central feature of any database system is the ability to sort the information stored in its tables. Often, users will establish a new sort order for a table. Moreover, the creation of the above-mentioned indexes depends, in part, on the system's ability to sort information. Methods of the Collation Engine of the present invention for sorting information with National Language Support will now be described in detail.

Improved Sorting with National Language Support

A. Data structures/tables employed for sorting

At the outset, it is helpful to first examine certain data structures employed by the Collation Engine of the present invention. Specifically, the methods employ: (1) a Collation Table, (2) a Character Type Table, (3) a One-to-two (1to2) Table, and (4) a Two-to-one (2to1) Table. With reference now to FIGS. 2A–E, each of these tables will be explained in further detail.

(1) Collation Table

Figure 2A:
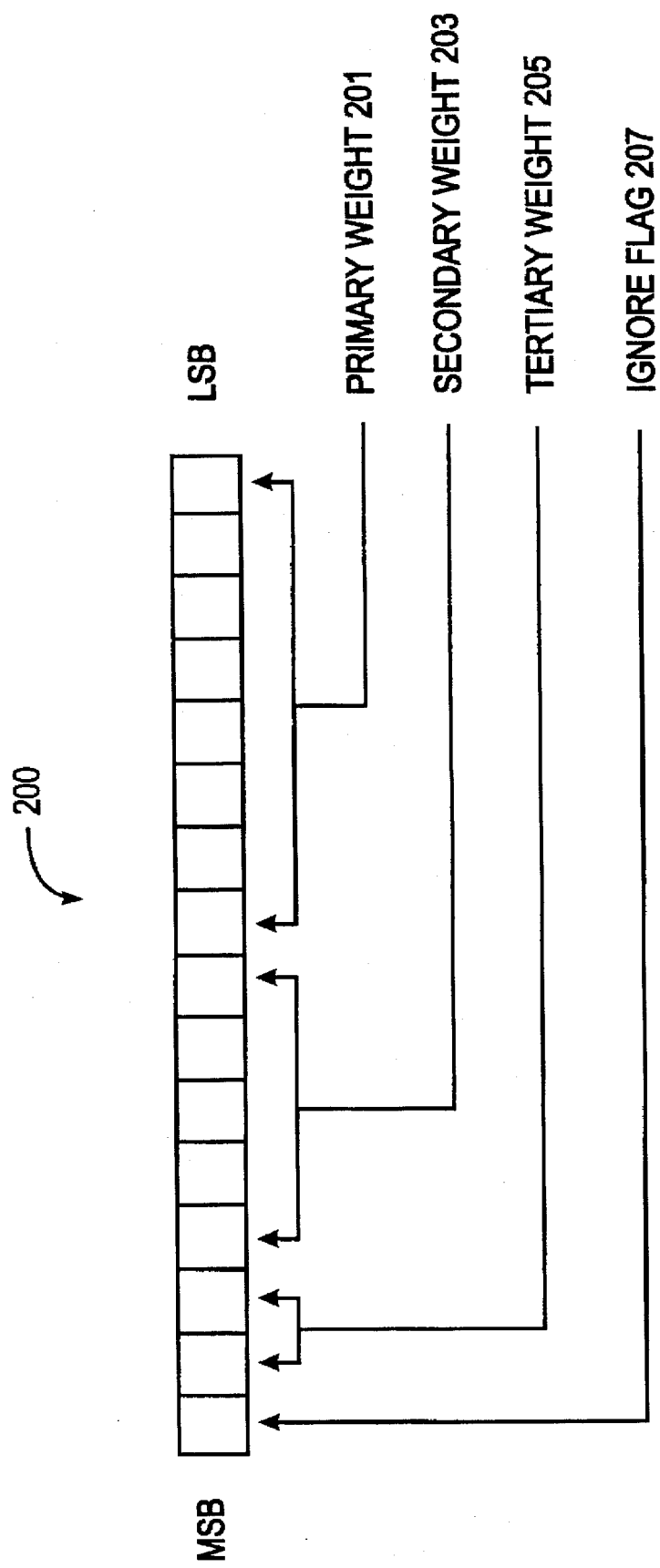
FIGS. 2A–E are block diagrams illustrating sorting tables employed by the system of the present invention, for providing comparison of text strings with a culturally-predictable result.

FIG. 2A illustrates a Collation Table Entry 200 from the Collation Table. Moving from the Least Significant Bit (LSB) to the Most Significant Bit (MSB), the entry stores a Primary Weight 201, a Secondary Weight 203, a Tertiary Weight 205, and an Ignore Flag 207. The Primary Weight 201 is an 8-bit hexadecimal number specifying the primary (controlling) weight given for a particular character. An example of a difference in primary weight would be the difference between the character "A" and the character "B ". Here, the primary weight of "B" is greater than the primary weight of "A", thereby indicating that (in English) a record storing the value of "A" would appear in a sort order before a record storing "B". The Primary Weight 201 is followed in the table by the Secondary Weight 203, a 5-bit number. The Secondary Weight tracks differences between similar characters, such as "a" and "á".

Collation tables in conventional systems provide a primary weight and a secondary weight, thus allowing characters to be divided into a number of groups. However, collation tables in conventional systems stop at this point— other locale-dependent factors are not taken into account. The conventional approach, as a result, tends to place a bias on case (as opposed to, say, an accent of a character). As locales may require upper case and lower case in a particular order for a given group, the conventional approach often yields a sort inappropriate for a particular locale.

To avoid this problem, therefore, the Collation Engine of the present invention provides the Tertiary Weight 205. The effect of adding a tertiary weighting is illustrated by a sort of the following three text strings:

Ae ae aé

A sort of the above characters would vary depending on the specific requirement of a particular country or locale.

Figure 2B:
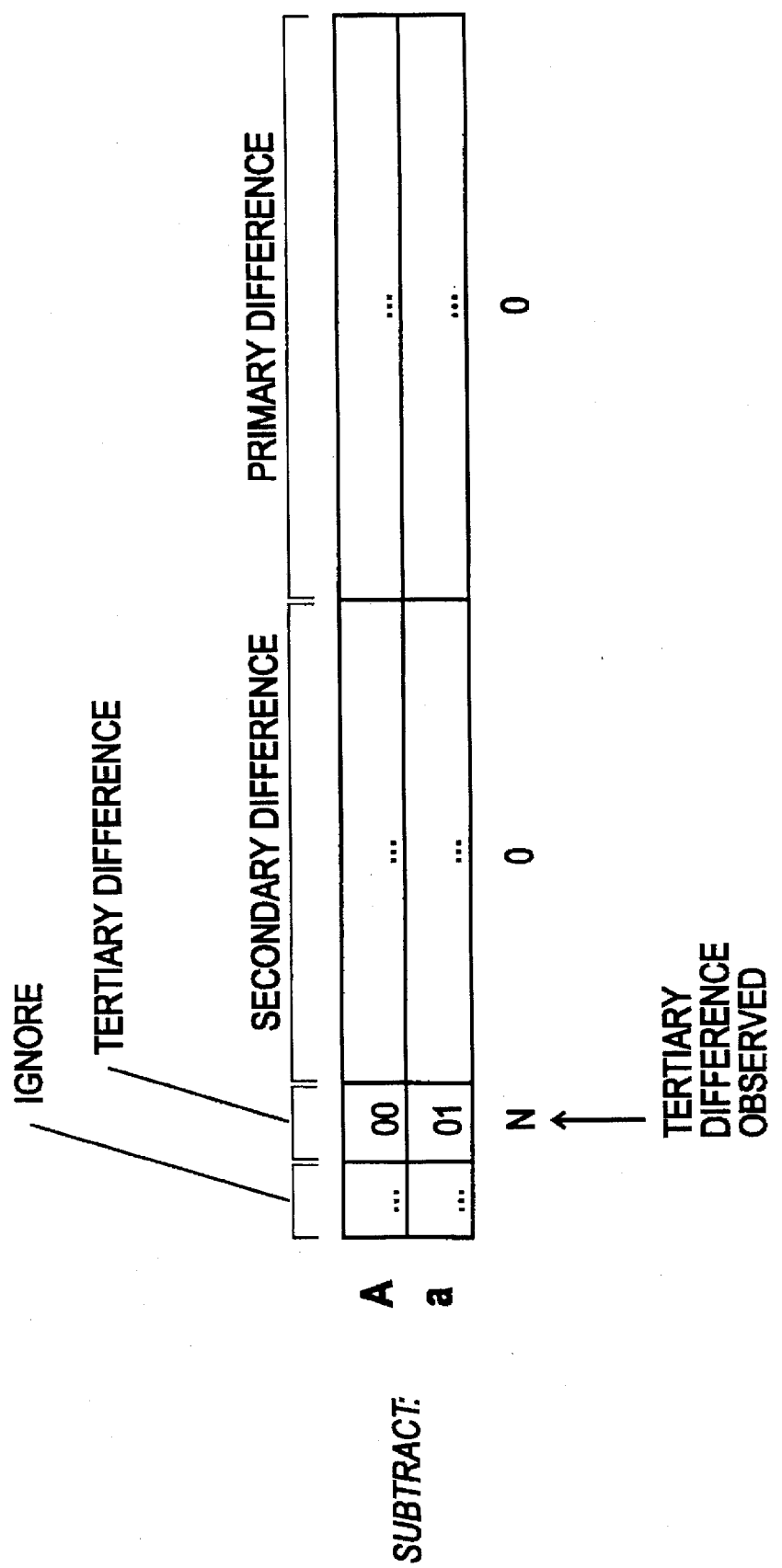

Generally, sorting proceeds by comparing the weightings on a character-by-character basis. Determination of the sort order of a particular pair of characters being compared proceeds as long as no difference is detected between the characters. In other words, a difference in primary weight is first examined. FIG. 2B illustrates determination of primary, secondary, and tertiary differences between "A" and "a". As shown, there is no primary difference, as each character is the same letter of the alphabet. Since no primary difference is found, a difference in secondary weight is next examined. The examination for a secondary difference shows that, again, the two characters have no secondary difference (i.e., there is no difference of accent mark, umlaut, or the like). After finding no secondary difference, a conventional approach would, at this point, conclude that the two characters are the same.

Nevertheless, a particular locale may specify additional rules for sorting. Additional rules include, for instance, a locale may have sorting rules specifying that the case of a character be taken into consideration. Other rules may specify that the expansion of an expanding character (e.g., "Æ " which expands to "AE") be taken into consideration. In the system of the present invention, therefore, an examination for these other differences are undertaken. In this manner, the invention may uncover the difference between the two characters, which would otherwise be ignored by conventional systems. Depending on locale, one of the two characters for the above example would, based on a tertiary difference (e.g., uppercasing), be accorded a greater weight. As shown in FIG. 2B, a comparison between the two characters may be viewed as a bit subtraction operation, for determining a difference of weightings between two characters.

In addition to the Tertiary Weighting, an Ignore Flag is provided as shown in FIG. 2A. The Ignore Flag indicates that the character is ignored until later in the comparison. Functionality of the Ignore Flag is described in greater detail hereinbelow.

(2) Character Type Table

Figure 2C:
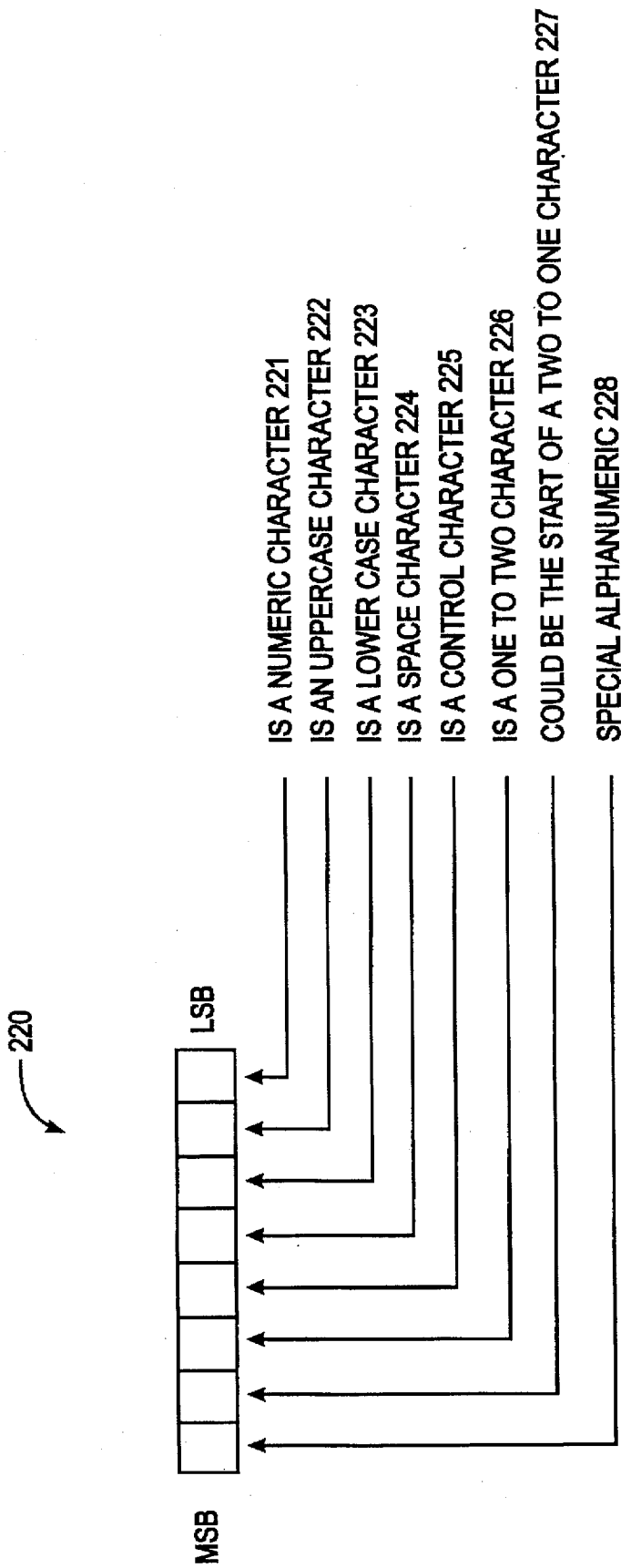

FIG. 2C illustrates a Character Type Entry 220 from the Character Type Table. As shown, working from LSB to MSB, the entry includes bit fields indicating whether the character is a Numeric Character 221, is an Uppercase Character 222, is a Lowercase Character 223, is a Space Character 224, and/or is a Control Character 225. The foregoing are bit fields which may be found in a conventional character type table (e.g., such as one provided as part of a C Standard Library). The Character Type Table 220, which is employed in the system of the present invention, is further enhanced as follows. The Table further comprises bit fields specifying whether the character is a 1to2 Character 226, could be the start of a 2to1 Character 227, and whether the character is a Special Alphanumeric Character 228. The Collation Engine of the present invention is concerned just with these latter bit fields, that is, fields 226, 227, and 228. An example of 1to2 character includes "æ" expanding to "ae". An example of the start of a 2to1 character includes the Spanish "ch" which, during sorting, is treated as a single character. The Special Alphanumeric Character field allows a particular embodiment to treat certain characters as alphanumeric. An example of a Special Alphanumeric Character would include, for example, the underscore character (i.e., "_") in dBASE®. There, the underscore character may be employed as part of a file name; accordingly, dBASE® prefers to treat the character as alphanumeric.

(3) 1to2 and 2to1 Tables

Figure 2D:
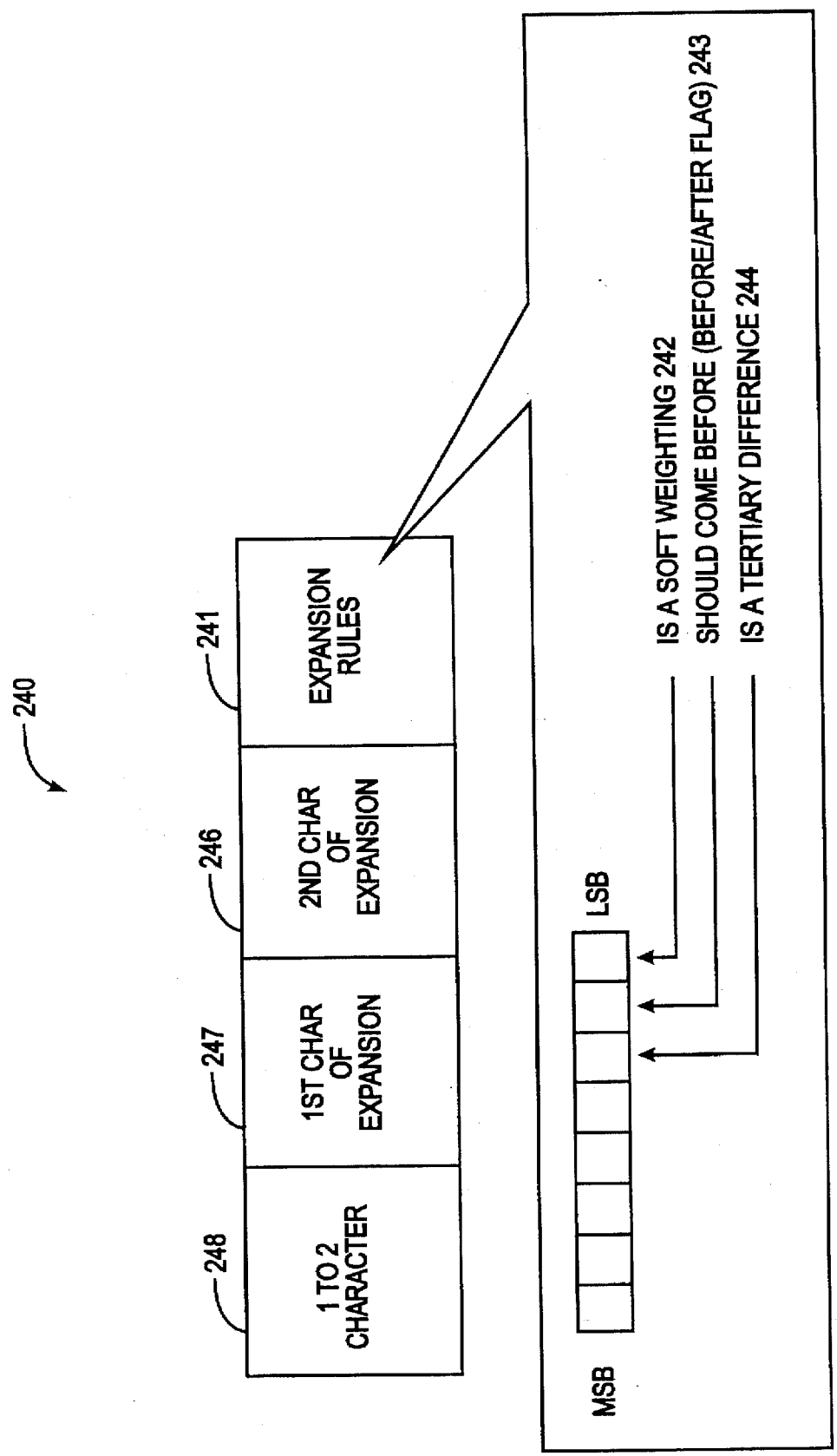
Figure 2E:
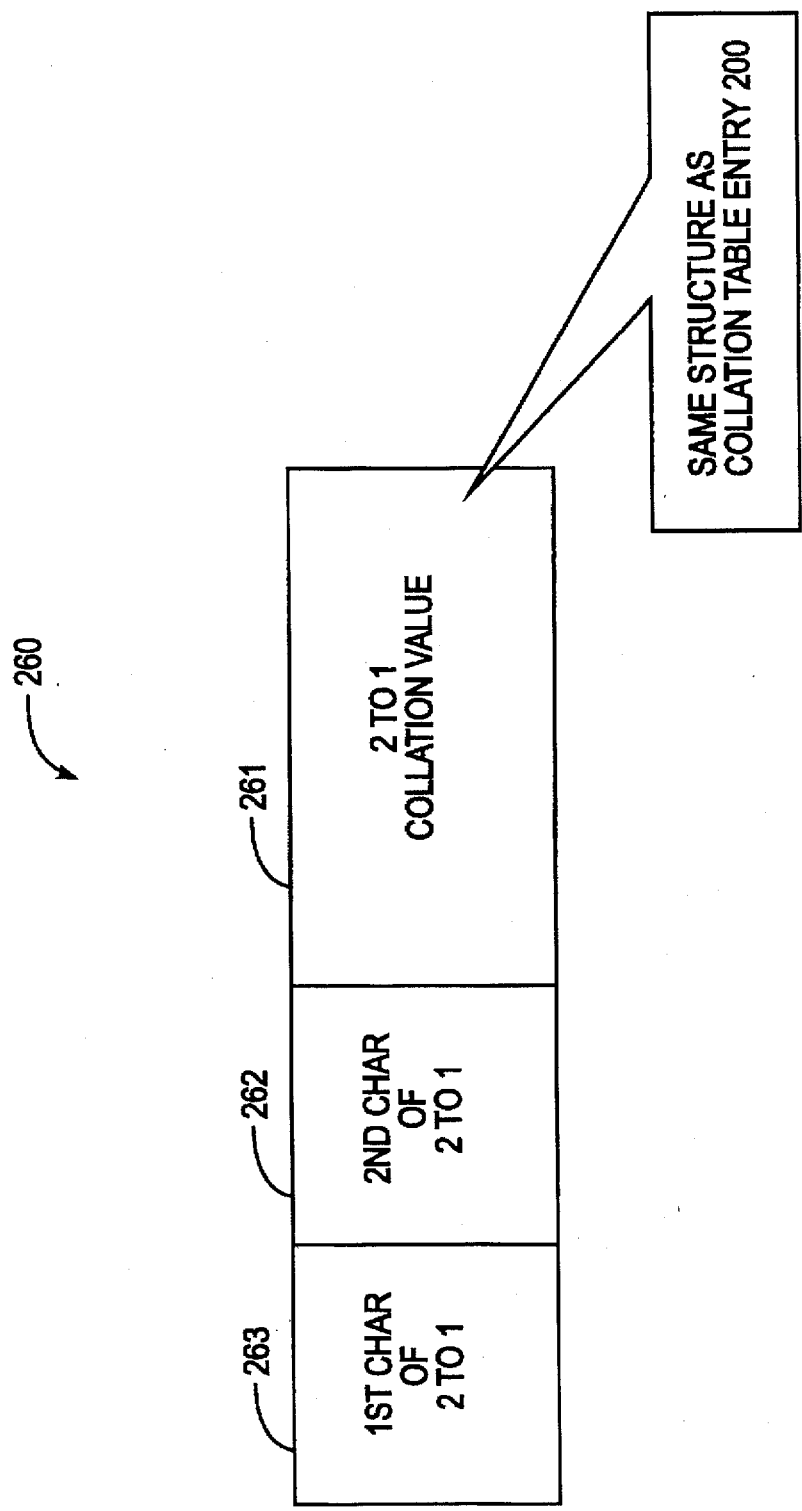

According to the present invention, the Character Type Table is further augmented by 1to2 ("One-to-two") and 2to1 ("Two-to-one") Tables. Structure for these tables are shown in FIGS. 2D–E. The 1to2 Table Entry 240, shown in FIG. 2D, includes an Expansion Rules Field 241, a Second Character of Expansion Field 246, a First Character of Expansion Field 247, and a 1to2 Character Field 248. As further shown, the Expansion Rules Field 241 comprises an 8-bit field storing a "Soft Weighting" Flag 242, a Before/After Flag 243 and a Tertiary Difference Flag 244.

Use of the Table Entry 240 will be illustrated by way of example. Consider the 1to2 character "æ". In the table entry for such a character, Field 248 stores the character number (ASCII value) of the character proper. Field 247 stores the character number for the first character after the 1to2 character has been expanded. Field 246 stores the second character of that expansion. The Before/After Flag 243 specifies whether the expanded characters should sort (i.e., be ordered) before or after an unexpanded version of those two characters. Conventionally, expansion of a character occurs such that the expanded characters are sorted or ordered after the unexpanded version of those characters. For instance, expansion of the German "ß" into two "s" characters (i.e., "ss") would result in the "ß" character being positioned after the "ss" characters. However, German locale collation rules for "ß" specify that "ß" should, instead, appear before the "ss" characters. This difference, therefore, may be taken into account by the Before/After Flag 243.

Note, further, that the German language is particular in that the "ß" is positioned before the "ss" characters unless the "ß" character is followed by an accented character. If an accented character occurs, that secondary difference (between the two strings) is taken into account, in lieu of the secondary difference between the expanded and unexpanded characters. This behavior may be accounted for by the Soft Weighting Bit Flag 242. Specifically, the soft weighting indicates that a secondary difference "downstream" may override the secondary difference observed between expanded and unexpanded characters.

This influences the operation of the Collation Engine as follows. During sorting, when a subsequent secondary difference is detected, if the Soft Weighting Flag is set, the subsequent secondary difference overrides the prior secondary difference (which occurred with the 1to2 character having a soft weighting). If the Flag is not set, however, the secondary difference (from the previous 1to2 character expansion) is not overwritten. In the latter case, the secondary difference from the 1to2 character expansion is controlling over subsequent secondary differences.

By keeping a separate Before/After Bit Flag for each character, the system treats each character as having its own set of rules. Thus, instead of having a global set of rules (i.e., all expanded characters come after), the system allows expanded characters to assume the proper sort behavior for a particular locale, such as the particular behavior of the "ß" character. In this manner, expanded characters may be positioned before or after, as appropriate for a given locale.

Although the Expansion Rules 241 include a bit field for a Tertiary Difference 244, the particular field is generally unused for most locales at present. Nevertheless, it is included in a preferred embodiment for future compatibility—allowing a particular locale to specify a tertiary difference for 1to2 characters.

B. Sorting with a culturally-predictable result

Figure 3A:
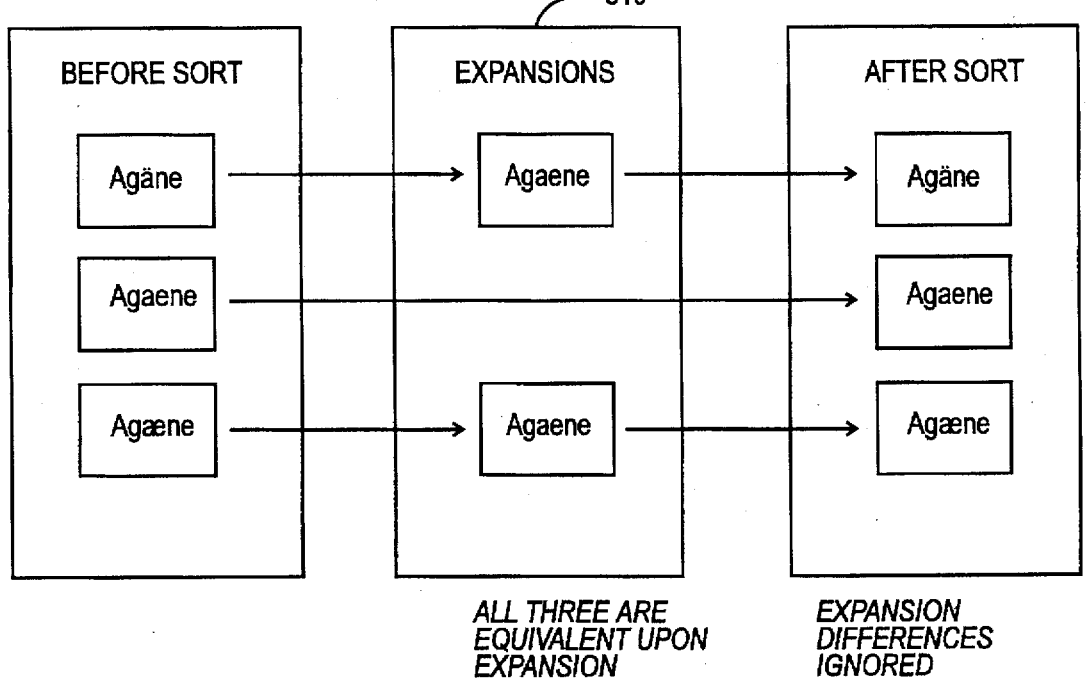
FIGS. 3A–B are block diagrams illustrating the effect of sorting with and without tertiary weightings.
Figure 3B:
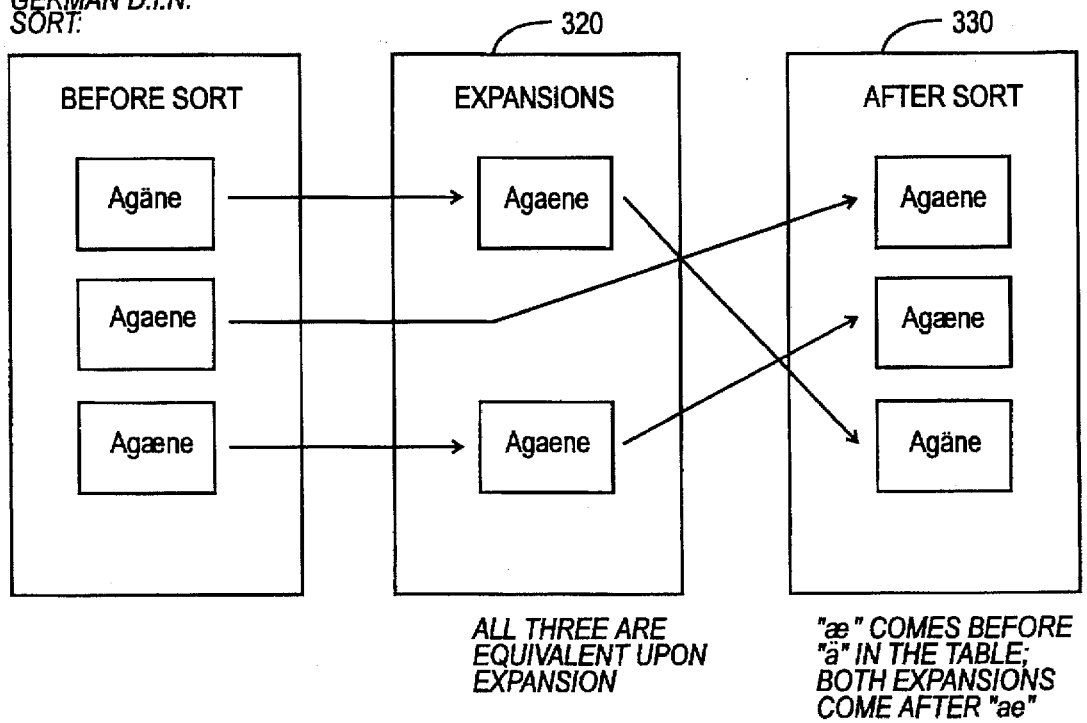

FIGS. 3A–B illustrate the effect of sorting with additional weightings. Specifically, sorting with and without the method of the present invention is demonstrated for the following German words: Agäne, Agaene and Agæne.

As shown in FIG. 3A, both "æ" and "ä" characters expand to "ae" for sorting. The locale rules for a German DIN sort specify that "æ" comes before "ä", and both expansions are set to come after "ae". Applying just convention sorting methodology, upon the expansion of the characters to "ae" as indicated at 310, all three German words are equivalent—conventional methodology at this point would only know that characters have been expanded to "ae". As shown in FIG. 3A, a conventional approach to sorting the three German words would yield a final sort order based on the natural order of the words (i.e., the order in which they are first received) since, after expansion, all three words would appear identical to a conventional collation engine.

The Collation Engine in the system of the present invention, in contrast, determines an additional difference between the words. As before, the characters are expanded to "ae" (indicated at Box 320). However, this does not degenerate into a sort by natural order (as was the case for FIG. 3A). Instead, each word includes an expansion to "ae" but also includes a weighting specifying the proper locale-specific sort order. As indicated by Box 330, therefore, the words are sorted according to their additional weightings, thus yielding the correct sort order (for a German DIN sort).

As just shown, the Collation Engine in the system of the present invention may, when appropriate, treat an expansion into two characters as an additional difference. However, this alone is not sufficient for specifying the final sort order. Specifically, once the Collation Engine has determined that an additional difference exists, the engine must also determine the appropriate ordering (for the particular locale) for the expanded character. This is done by arranging the 1to2 characters in the 1to2 Table according to the sort order for the locale. In this manner, the relative position of the 1to2 character in the 1to2 Table (i.e., its offset or index into the table) specifies the appropriate ordering for this character. Accordingly, the character "æ" is stored at a relative offset coming before "ä". Further, both of these entries set the Before/After Flag 243, for indicating that these expanded characters should be sorted after the characters "ae".

Referring back to FIG. 2E, the 2to1 Table will now be described in further detail. Examples of a 2to1 character include the Spanish "ch" and "ll". The Spanish "ch" sorts after "c" ; thus, the word "che" would sort after the word "cze". The Collation Engine's approach to correctly sorting 2to1 characters is somewhat analogous to that employed for 1to2 characters. However, the process is complicated since the Collation Engine does not know initially that it is, in fact, dealing with a 2to1 character.

It should be noted that for an expansion of 1to2 characters, the Collation Engine of the present invention will continue character comparison for the entire string, unless a primary difference is encountered. For example, if given a word comprising five 1to2 expanding characters in a five character space (e.g., a dBASE alphanumeric field having a character width of five), the Collation Engine carries the comparison through to all five expanding characters (assuming no primary difference is encountered). In this manner, no characters "fall off"—that is, no characters are ignored as a result of having expanded beyond the allowed character space.

The Ignore Flag is set when a character is ignored for sorting purposes. Examples of ignored characters include, for instance, a hyphen, an exclamation point, and a # sign for a dictionary sort in U.S. English. Generally, these are non-alphabetic, non-numeric characters. The ignore character is not completely ignored in a preferred embodiment, however. If two strings are identical apart from the occurrence of an ignored character, the Collation Engine must still process the ignore character. Consider, for instance, the word "co-op" compared against "coop". If the ignore character were entirely ignored, the two would be equivalent for purposes of the sort (i.e., the two are equivalent to "coop"). The Collation Engine of the present invention, however, re-examines whether an ignore character occurred, after the engine has completed its initial sort. At that point, the engine may re-position the word having an ignore character to its appropriate position (based on locale-specific rules).

Internal Operation

Figure 4A:
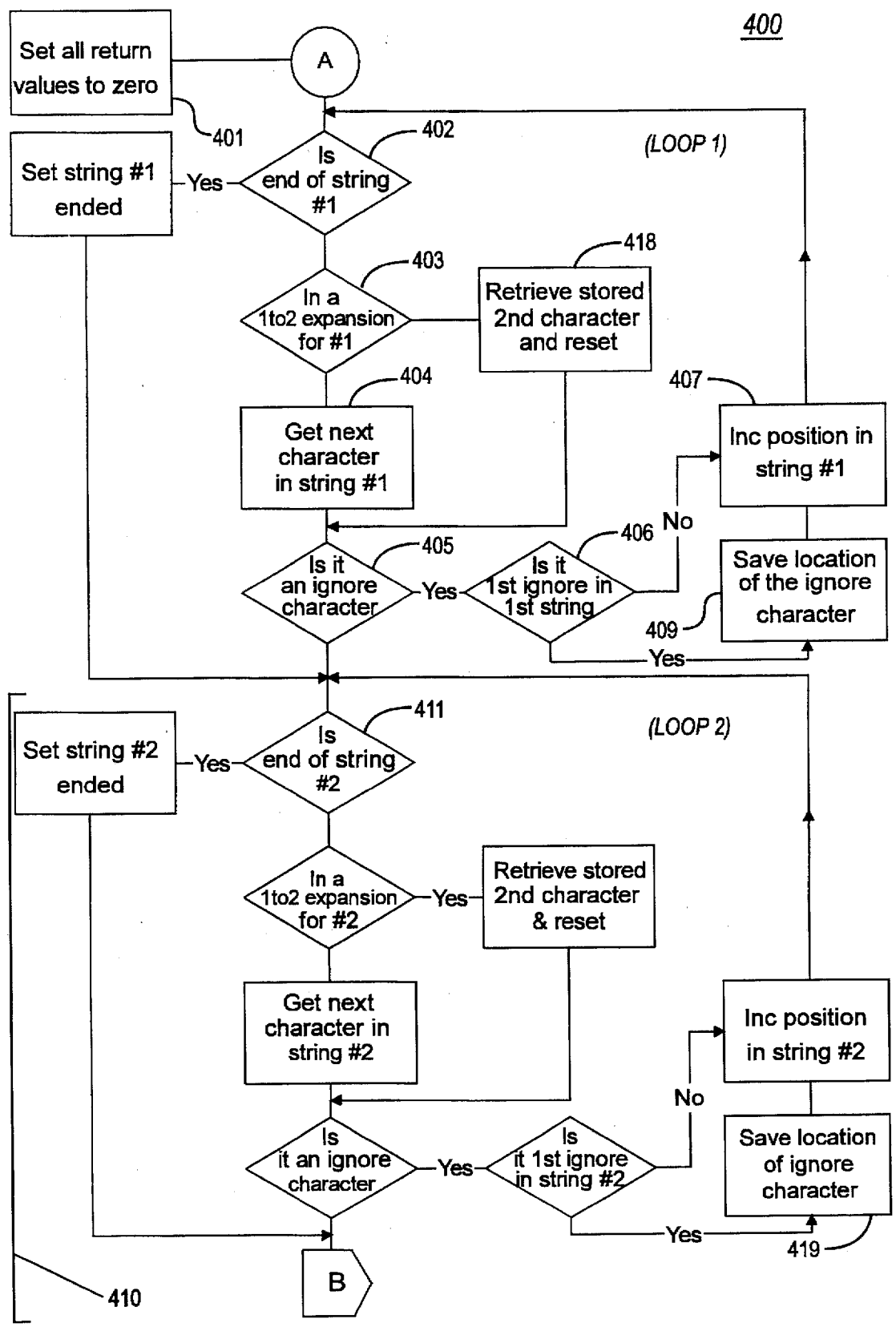
FIGS. 4A–C comprise a flow chart illustrating a method of the present invention for comparing text strings with a culturally-predictable result.
Figure 4B:
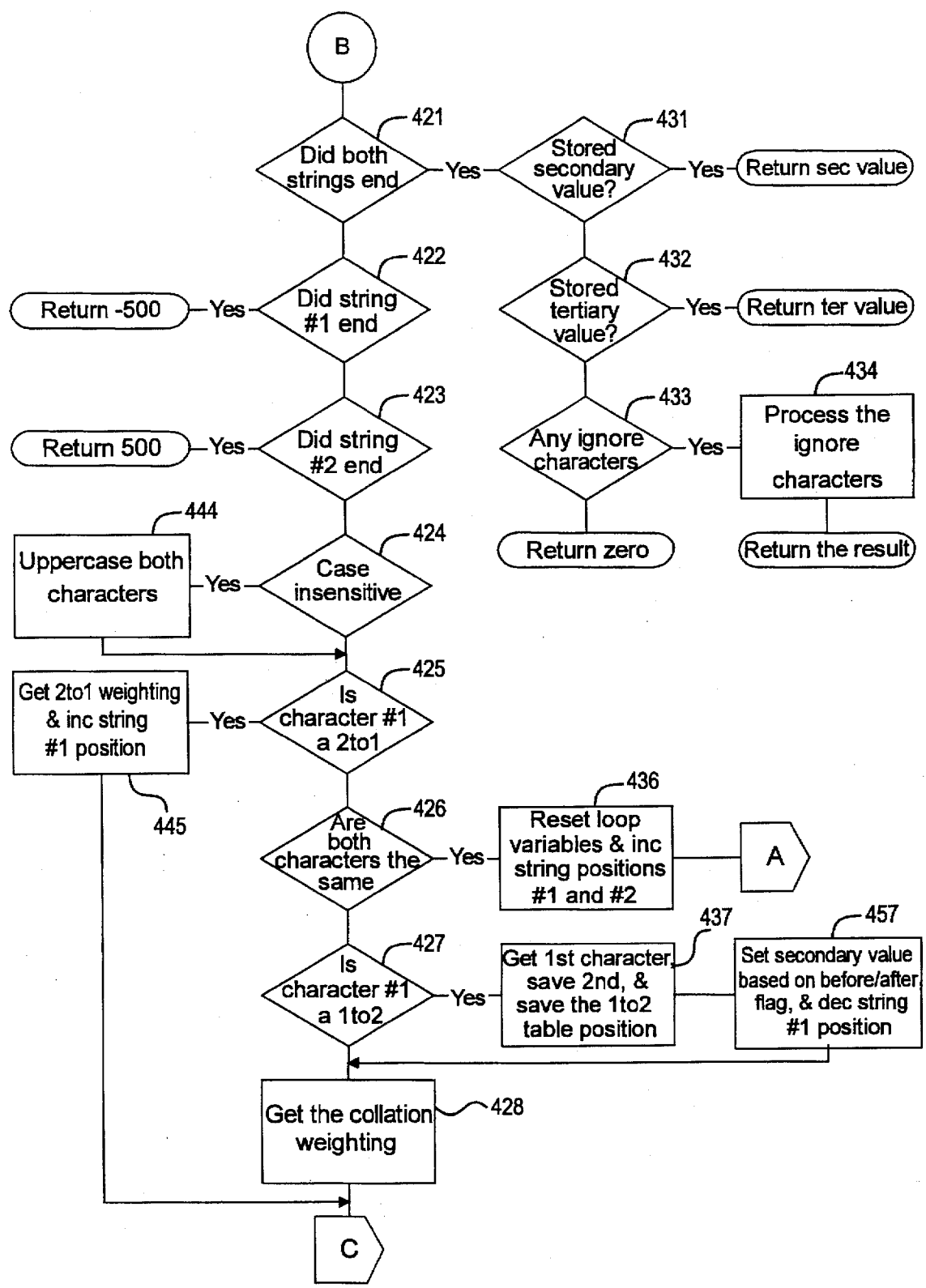
Figure 4C:
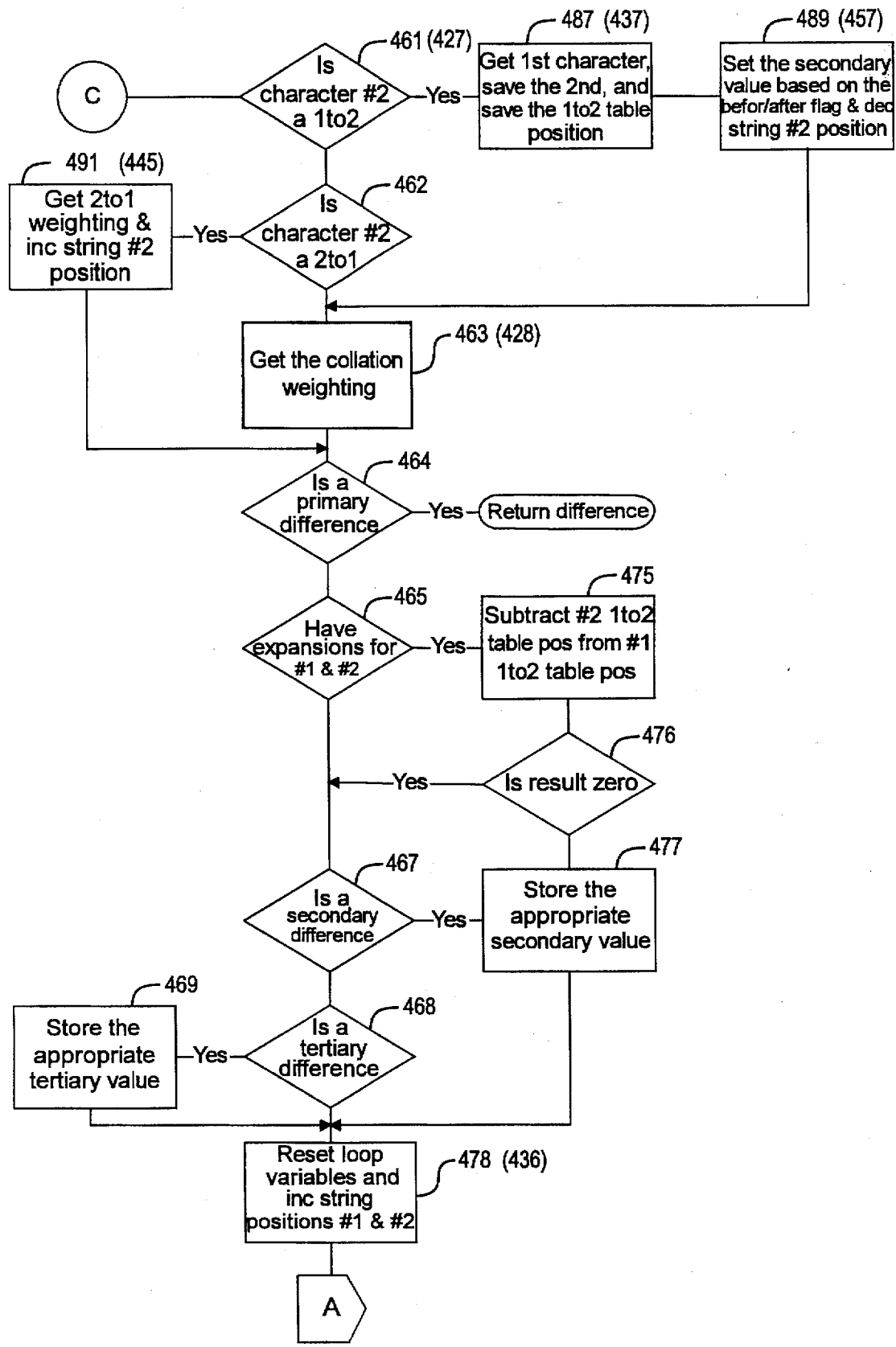

Referring now to FIGS. 4A–C, a method 400 of the present invention for sorting text strings with a culturally predictable result will now be described. In an exemplary embodiment, the method is embodied in a C function, uk_compare. The function is invoked with the following four parameters: s, t, upshift, and size. The first two, s and t, are the two strings to be compared. The upshift parameter specifies whether the comparison is case insensitive (in which case everything is treated as uppercase). Finally, the size parameter specifies the number of characters to be compared. If size is set equal to zero, the method will compare the strings to the end.

As a result of the comparisons, the method returns a return value indicating the results of the comparison as follows:

<0 string one comes before string two
>0 string one comes after string two
=0 string one and string two are the same More specifically, the return value has the following significance:

(1) –255 to 255 represents a PRIMARY difference
(2) –499 to 499 represents a difference other than primary
(3) –500 represents that string one ended before string two, without a primary difference
(4) 500 represents that string two ended before string one, without a primary difference In operation, the method proceeds as follows. As shown in FIG. 4A, at Step 401 local variables used for return values are initialized to zero. This step resets the values stored in variables (local to the module) that track secondary and tertiary differences. Next, the method enters a first loop, denoted by the entry point A. At Step 402, the method tests the looping condition: has the end of string #1 been reached? If the end of the string has in fact been reached (yes at Step 402), then the method drops out of the first loop, whereupon it begins a second loop (loop 2), at Step 411. Thus, at Step 402, the method is testing a current position (i.e., a particular character) against the length of the string.

If the method has not reached the end of the string (no at Step 402), then the method proceeds to Step 403 to test whether the method is currently in a 1to2 expansion for the first siring. Recall that a 1to2 expansion may include, for instance, an expansion of the character "æ" into the two characters "ae". In the instance that the method is in fact in a 1to2 expansion, the method proceeds to Step 418 to retrieve the second character of the previous expansion. Also at this step, the method resets a 1to2 local variable (i.e., the one storing the second character), thereby indicating that the current character under examination is no longer in a 1to2 expansion. From Step 418, the method will proceed to Step 405.

If, on the other hand, the method is not in a 1to2 expansion for the current character under examination (no at Step 403), then the method proceeds to Step 404 to retrieve the next character in string #1. In other words, the decision branch at Step 403 determines whether the method should retrieve the second character of a 1to2 expansion or, instead, simply get the next character in the string. When an expansion occurs, therefore, the method temporarily "puts away" the second character, thereby indicating that the next pass is in a 1to2 expansion. At Step 418, that second character is retrieved for processing.

At Step 405, the method determines if the current character is an ignore character (e.g., hyphen character). If this is the first ignore character in the first string (yes at Step 406), the location of this first ignore character is saved, as indicated by Step 409, before the method proceeds to Step 407. As previously mentioned, an ignore character may, on occasion, be used to resolve strings which are otherwise identical. At Step 407, the method ignores the character for the moment, by incrementing the current position in string #1 and then looping back to Step 402 (to retest whether the end of string #1 has yet been reached).

Upon reaching a character which is not an ignore character (no at Step 405), the method proceeds to Step 411—the beginning of loop 2 (Block 410). Loop 2 is essentially identical to loop 1 except that its steps are being performed for the second string. Accordingly, the steps are modified in Block 410 to operate on the second string. For instance, Step 419 in Block 410 saves the location of the ignore character in the second string in a second variable (i.e., one apart from the variable used to store the location in Step 409). The steps of Block 410 are otherwise essentially the same steps. In essence, loop 1 and loop 2 continue looping through characters until either a "real" character (i.e., not an ignore character) is found or its respective string (e.g., string #1 for loop 1) has ended. After both loops have concluded, the method proceeds to entry point B.

FIG. 4B illustrates the steps of the method which follow entry point B. At Step 421, the method checks whether both strings have ended. If both strings end at Step 421, the method determines whether there is a stored secondary value. Note that if a primary difference is observed during string comparison, both strings would not end since a primary difference has already been found (and Step 431 would not have been reached). In other words, the method can only get to Step 431 if both strings ended, which can only happen if a primary difference between the strings did not occur.

In the instance that a stored secondary value is observed at Step 431, that value is returned as the returned value. Otherwise (no at Step 431), the method proceeds to Step 432, for determining whether a stored tertiary value exists. In the event that a tertiary value exists (yes at Step 432), the method proceeds to return the tertiary value as the return value. Otherwise (no at Step 432), the method proceeds to Step 433 to determine whether any ignore characters exist.

If no ignore characters exist at Step 433, then the strings are identical and a return value of zero is returned. Otherwise (yes at Step 433), the method proceeds to Step 434 to process the ignore characters (according to locale-specific criteria), whereupon the result is returned as the return value. Recall that the location of the first ignore character in a string is stored when it is encountered. Generally, the string containing the ignore character is sorted "after"; however, the preference given may be adjusted for a given locale, if desired.

If both strings have not ended at Step 421, the method proceeds to Step 422 for determining if string #1 has ended. Recall that a flag was set at Step 417 for indicating that the string #1 had ended; a corresponding flag is set for string #2 in Block 410. If both have not ended, the following conditions are acted upon. If only string #1 has ended, the method returns the return value of −500 (yes at Step 422). If string #1 had not ended, however, the method proceeds to Step 423 where the method may return the return value of 500.

In the event neither string has ended, the comparison method proceeds. At Step 424, the characters are converted to uppercase, at Step 444, if the comparison is to be case insensitive (as specified by the case argument to the routine). At this step, each character may be converted using a case lookup table (i.e., one storing the uppercase code point on a character-by-character basis). At Step 425, the method tests whether the first character is a 2to1 character. If yes, then the method proceeds to Step 445 to get the 2to1 weighting for the character and then increment the current position in string #1. Recall that the 2to1 Table includes a list of character code point of characters which could start a 2to1 compression. Consider, for example, the Spanish character "ch". Further consider that the current character under examination is "c" and the next character in the string is "h". For such a combination, at Step 445, the method would look up a 2to1 weighting for "ch" in the table. Upon finding such a character in the table, Step 445 retrieves the collation weighting for that character (i.e., as if it were a normal character). In such an instance, therefore, the "regular" step of retrieving the collation weighting for a character (i.e., Step 428) is skipped. Finally at Step 445, the string position for string #1 is incremented since the method has now taken two characters (e.g., "oh") as one; the effect of incrementing is to skip past the second character (e.g., "h" in a "ch" compression).

If at Step 425 the character #1 is not a 2to1 character, the method proceeds to Step 426 to determine if both characters being compared are the exact same. Note that at Step 426, the two characters can be compared without regard to whether they expand since, if they are exactly the same, they will expand the same. If the two characters are the same at Step 426, the method proceeds to Step 436 to reset the loop variables and increment the string positions for both string #1 and string #2. In other words, if the method has determined that both characters are exactly the same at Step 426, the method can take a short cut: simply continue on to examine the next pair of characters.

If both characters are not the same at Step 426, the method proceeds to Step 427 to determine if the first character is a 1to2 character. If it is not a 1to2 character, the method can simply proceed to Step 428 to get the collation weighting for the character and then proceed to entry point C. If, however, character #1 is a 1to2 character, the method proceeds to Step 437. At that step, the method gets the first character (e.g., "a" from "æ"), gets and saves the second character (e.g., "e" for "æ"), and saves the 1to2 Table position (i.e., the index into the table—the offset for that entry into the table).

At Step 457, the method sets the secondary value based on the Before/After Flag (Flag 243 from Table 240), and decrements the string position for string #1. For a 1to2 character, the string position pointer is actually decremented since the next time through the loop, the method will be incrementing the position pointers but will, for a 1to2 character, be retrieving the character from storage (i.e., the second character which was saved to a variable). It is at this step, therefore, that the method keeps the two strings (i.e., respective slots in the two strings) synchronized during a 1to2 expansion. After Step 457, the method proceeds to Step 428 to retrieve the collation weighting for that 1to2 character. The code point (ASCII value) is employed as an index into the collation table, for retrieving its weighting. At that point, the method has the collation weighting for the first character of a 1to2 character. After Step 428, the method proceeds to entry point C.

FIG. 4C illustrates entry point C and accompanying steps. At Step 461, the method tests whether the current character in the second string is a 1to2 character. If yes at that step, the method will perform Steps 487 and 489, whose functionality is essentially identical to Steps 437 and 457 (except they are now operating on the character of string #2 instead of string #1). After Step 489, the method may proceed to Step 463 for retrieving the collation weighting (in a manner similar to that described for Step 428).

If, at Step 461, the character for the second string is not a 1to2 character, the method proceeds to Step 462 to determine whether the character is a 2to1 character. If not, then the method may simply proceed to Step 463 (analogous to Step 428) to get the collation weighting for the character. Otherwise (yes at Step 462), the method proceeds to Step 491 (analogous to Step 445) where the method gets the 2to1 weighting and increments the position for string #2; in such an instance, the step of retrieving the collation weighting at 463 may be skipped.

Next, the method proceeds to Step 464 to determine whether a primary difference exists. If yes at that step, the method may return the difference as the previously-described return value. Upon detecting a primary difference, no further comparison is required. If no primary difference is evident at Step 464, however, the method tests at Step 465 for expansions of current characters for string #1 and string #2. If such an expansion is detected, then the method proceeds to Step 475 to subtract the 1to2 table position for character #2 from the 1to2 Table position for character #1. If the result of the subtraction is zero, at Step 476, then the method proceeds to Step 467. There, the method determines whether there exists a secondary difference. If either a secondary difference exists at 467 or the subtraction in Step 476 is not zero, the method will store the appropriate secondary value at Step 477. After Step 477, the method proceeds to Step 478 which is analogous to previously-described Step 436: the method resets the loop variables, increments the pointers for string position #1 and #2, and loops to entry point A. If a secondary difference is not detected at Step 467, the method proceeds to Step 468 to determine whether a tertiary difference exists. If yes at this step, the appropriate tertiary value is stored at Step 469. Upon the conclusion of Step 469 or in the event that no tertiary difference exists (no at Step 468), the method proceeds to the above-described Step 478, for looping back to entry point A.

Attached hereto is an Appendix A containing source code listings in the C programming language, which provide a description of the invention suitable for use in a general purpose digital computer system, such as an IBM-compatible personal computer. A suitable compiler for compiling and linking C/C++ code is available from several vendors, including Borland International of Scotts Valley, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is, instead, defined by the appended claims.

APPENDIX A

```
/*********************************************************************/
/* uk_compare()

s,t      strings to be compared
        upshift  case insensitive, turn everything to uppercase
        size     number of characters to be compared.
                 if 0, then compare to end
/*********************************************************************/
uk_compare(s,t,upshift, size)
#if PORTABLE
uchar *s;
uchar *t;
#else
char  *s;
char  *t;
#endif
int   upshift;
int   size;
{
#if PORTABLE
    uchar sc, tc;
    uchar sc1, tc1;
    uchar sc2, tc2;
#else
    char sc, tc;
    char sc1, tc1;
    char sc2, tc2;
#endif
    int   i, sc1to2, tc1to2, ret1, ret2, s2w, t2w;
    int   scol, tcol, ssoft, tsoft;
    int   *ptr;

sec_value = 0;
    ter_value = 0;
    status = 0;
    tsp = NULL;
    ssp = NULL;
    sc1to2 = 0;
    tc1to2 = 0;
    s2w = 0;
    t2w = 0;
    ssoft = 0;
    tsoft = 0;

if (size)
        {
        slen = strlstlen(size, s);
        tlen = strlstlen(size, t);
```

28

```
                status |= STRSEQUAL;
                }
            else
                {
                slen = strlen(s);
                tlen = strlen(t);
                if ( slen == tlen )
                    status |= STRSEQUAL;
                } s_index = s;
            t_index = t;

while (1)
                {
                while (1)
                    {
                    if ( s_index - s >= slen )
                        {
                        status |= SENDED;
                        break;
                        }
                    if (!sc1to2)
                        {
                        sc = *s_index;
                        }
                    else
                        {
                        sc = sc1to2;
                        sc1to2 = 0;
                        s2w = 0;
                        }
                    if ( !(coltab[sc] & IGNORE) )
                        break;
                    if ( !ssp )
                        ssp = s_index;
                    s_index++;
                    } while (1)
                    {
                    if ( t_index - t >= tlen )
                        {
                        status |= TENDED;
                        break;
                        }
                    if (!tc1to2)
                        {
                        tc = *t_index;
                        }
                    else
```

29

```
            {
            tc = tc1to2;
            tc1to2 = 0;
            t2w = 0;
            }
        if ( !(coltab[tc] & IGNORE) )
            break;
        if ( !tsp )
            tsp = t_index;
        t_index++;
        } if ( (status & SENDED) && !(status & TENDED) )
        return (-500);

if ( (status & TENDED) && !(status & SENDED) )
        return (500);

if (status & (SENDED|TENDED) == (SENDED|TENDED))
        return( decode_ret(s,t) );

if (upshift)
        {
        sc = ustu_tab[sc];
        tc = ustu_tab[tc];
        } if ( (sc == tc) && ( !(usct_tab[sc] & DB_IS_TWO2ONE) ) )
        {
        s_index++;
        t_index++;
        continue;
        }
    /* get collation values */
    scol = coltab[sc];
    tcol = coltab[tc];

if (usct_tab[sc] & DB_IS_ONE2TWO)
        {
        s2w = 0;
        i = 0;
        while ( one2tab[i] )
            {
            if ( one2tab[i] == sc )
                {
                sc = one2tab[i + 1];
                if (upshift)
                    sc = ustu_tab[sc];
                sc1to2 = one2tab[i + 2];
                scol = coltab[sc];
```

```
                                30
                    s2w = one2tab[i + 3] << 8;
                    s2w |= (i/3) + 1;
                    s_index--;
                    break;
                  }
                i += 4;
              }
          }
        else
          {
            if (usct_tab[sc] & DB_IS_TWO2ONE)
              {
                if ( ((s_index  - s) + 1) < slen )
                  {
                    i = 0;
                    sc2 = *(s_index + 1);
                    if (upshift)
                        sc2 = ustu_tab[sc2];
                    while (two1tab[i])
                      {
                        if ( (two1tab[i] ==  sc) && (two1tab[i+1] == sc2) )
                          {
                            i += 2;
                            ptr = (int *)(&two1tab[i]);
                            scol = *ptr;
                            s_index++;
                            break;
                          }
                        i += 4;
                      }
                  }
              }
          } if (usct_tab[tc] & DB_IS_ONE2TWO)
          {
            t2w = 0;
            i = 0;
            while ( one2tab[i] )
              {
                if ( one2tab[i] == tc )
                  {
                    tc = one2tab[i + 1];
                    if (upshift)
                        tc = ustu_tab[tc];
                    tc1to2 = one2tab[i + 2];
                    tcol = coltab[tc];
                    t2w = one2tab[i + 3] << 8;
                    t2w |= (i/3) + 1;
                    t_index--;
                    break;
```

```
                            31
                    }
                 i += 4;
               }
             }
           else
             {
               if (usct_tab[tc] & DB_IS_TWO2ONE)
                 {
                   if ( ((t_index  - t) + 1) < tlen )
                     {
                       i = 0;
                       tc2 = *(t_index + 1);
                       if (upshift)
                          tc2 = ustu_tab[tc2];
                       while (twoltab[i])
                          {
                            if ( (twoltab[i] ==  tc) && (twoltab[i+1] == tc2) )
                              {
                                i += 2;
                                ptr = (int *)(&twoltab[i]);
                                tcol = *ptr;
                                t_index++;
                                break;
                              }
                            i += 4;
                          }
                     }
                 }
             }

/* compare primary values */
           ret1 = (scol & 0x00FF) - (tcol & 0x00FF);
           if (ret1)
              return (ret1);

/* check secondary values */
           ret1 = ( (scol & SECVAL) >> 8 ) - ( (tcol & SECVAL) >> 8);
           if ( ret1 && (!sec_value || (ld_order & SREVERSE) || ssoft) )
             {
               if (ret1 > 0)
                  sec_value = 300;
               else
                  sec_value = -300;
               ssoft = 0;
             }
           else
             {
               ret1 = ( (scol & TERVAL) >> 13 ) - ( (tcol & TERVAL) >> 13);
               if (ret1 && (!ter_value || (ld_order & TREVERSE) || tsoft))
                  ter_value = (ret1 > 0)?300:-300;
               else
```

32

```
            {
            ret1 = (s2w & 0x00FF) - (t2w & 0x00FF);
            if ( ret1 )
                {
                ret2 = s2w | t2w;
                if ( s2w && t2w && !(ld_order & USE_EXWGTS))
                    ret1 = 0;
                }
            if ( ret1 )
                {
                if ( !( s2w && t2w) && (ret2 & EX_IS_BEFORE) )
                    ret1 *= -1;
                if ( ret2 & EX_IS_SEC )
                    {
                    if ( !sec_value || (ld_order & SREVERSE) )
                        {
                        if ( !sec_value || ( ret2 & EX_IS_HARD) )
                            {
                            sec_value = (ret1 > 0)?300:-300;
                            if ( !(ret2 & EX_IS_HARD) )
                                ssoft = 1;
                            }
                        }
                    }
                else
                    {
                    if ( !ter_value || (ld_order & TREVERSE) )
                        {
                        if ( !ter_value || ( ret2 & EX_IS_HARD) )
                            {
                            ter_value = (ret1 > 0)?300:-300;
                            if ( !(ret2 & EX_IS_HARD) )
                                tsoft = 1;
                            }
                        }
                    }
                }
            }
        s2w = 0;
        t2w = 0;
        s_index++;
        t_index++;
        }
    } int decode_ret(s,t)
    #if PORTABLE
    uchar *s;
    uchar *t;
    #else
```

33

```
            char    *s;
            char    *t;
            #endif
            {
 5              int ret1, ret2;

if (ld_order & TFIRST)
                    {
                    ret1 = ter_value;
10                  ret2 = sec_value;
                    }
                else
                    {
                    ret2 = ter_value;
15                  ret1 = sec_value;
                    }
                if (ret1)
                    return(ret1);
                if (ret2)
20                  return(ret2);

/* resolve ignore characters */
                while(1)
                    {
25                  if (!ssp && !tsp)
                        return(0);
                    if (ssp && !tsp)
                        return(300);
                    if (!ssp && tsp)
30                      return(-300);
                    ret1 = (ssp - s) - (tsp - t);
                    if ( ret1 )
                        {
                        if ( ret1 > 0 )
35                          return( -300 );
                        return ( 300 );
                        }
                    if ( *ssp != *tsp )
                        {
40                      ret1 = (coltab[*ssp] & 0x00FF) - (coltab[*tsp] & 0x00FF);
                        if (ret1)
                            {
                            if ( ret1 > 0 )
                                return (300);
45                          return (-300);
                            }
                        ret1 = ((coltab[*ssp] & SECVAL) >> 8) - ((coltab[*tsp] & SECVAL)
            >> 8);
                        if (ret1)
50                          {
                            if ( ret1 > 0 )
```

34

```
                return (300);
            return (-300);
            }
        ret1 = ((coltab[*ssp] & TERVAL) >> 13) - ((coltab[*tsp] & TERVAL)
        >> 13);
        if (ret1)
            {
            if ( ret1 > 0 )
                return (300);
            return (-300);
            }
        }
    s_index = ssp + 1;
    t_index = tsp + 1;
    ssp = NULL;
    tsp = NULL;
    while (s_index - s < slen)
        {
        if (coltab[*s_index] & IGNORE)
            {
            ssp = s_index;
            break;
            }
        s_index++;
        }
    while (t_index - t < tlen)
        {
        if (coltab[*t_index] & IGNORE)
            {
            tsp = t_index;
            break;
            }
        t_index++;
        }
    }
}
```

What is claimed is:

1. In a computer system, a method for comparing characters in text strings according to rules establishing a locale-specific sort order for said characters, at least one of said characters comprising a character which expands from one character to two characters for sorting, the method comprising:

storing a table comprising a plurality of one-to-two character expansion entries, each entry storing first and second expanded characters which a given one-to-two character expands into for sorting, each entry further storing a flag for indicating whether said given one-to-two character is sorted before or after said first and second expanded characters;

receiving a request for comparing first and second text strings, said first text string comprising a one-to-two character which expands into first and second expanded characters for sorting, said second text string comprising at least two characters which are identical to said first and second expanded characters;

determining, based on the entry for said one-to-two character in said table, which of said first and second text strings is ordered first in a sort performed according to said locale-specific sort order by comparing said one-to-two character of said first text string with said at least two characters of said second text string; and in response to said determining step, specifying which string is order first in a sort performed according to said locale-specific sort order.

2. The method of claim 1, wherein said determining step comprises:

expanding said one-to-two character of said first text string, based on the entry for said one-to-two character in said table, into first and second expanded characters for sorting;

if the entry for said one-to-two character in said table specifies that said one-to-two character of said first string is sorted before said first and second expanded characters for said one-to-two character in said table, specifying that said first string is order before said second text string in a sort performed according to said locale-specific sort order; and otherwise, specifying that said first string is order after said second text string in a sort performed according to said locale-specific sort order.

3. The method of claim 1, wherein said rules establishing a locale-specific sort order comprise at least one rule specifying that a particular one-to-two character is to be ordered before first and second expanded characters of said particular one-to-two character.

4. The method of claim 1, wherein said rules establishing a locale-specific sort order comprise at least one rule specifying that a particular one-to-two character is to be ordered after first and second expanded characters of said particular one-to-two character.

5. The method of claim 1, wherein at least one of said characters comprising a character which expands from one character to two characters for sorting is an "æ" character which expands from an "æ" character to "a" and "e" characters for sorting.

6. The method of claim 1, wherein each of said entries further stores a tertiary flag, for indicating whether expansion of the character for a corresponding entry is considered only after processing secondary differences based on diacritic marks present in the text strings.

7. In a computer system for sorting text strings comprising international characters according to a locale-specific sort order, an improved method for comparing characters in text strings which expands from one character to two characters for sorting, the method comprising:

storing a table comprising a plurality of one-to-two character expansion entries, each entry storing first and second expanded characters which a given one-to-two character expands into for sorting, each entry further storing a flag for indicating whether said given one-to-two character is sorted before or after said first and second expanded characters, said plurality of entries being stored in said table in an order which indicates a sort order for each one-to-two character in the table relative to other one-to-two characters in the table;

receiving a request for comparing first and second one-to-two characters, said first and second one-to-two characters expanding into identical first and second expanded characters for sorting;

determining, based on respective entries in said table for said first and second one-to-two characters, which of said first and second text strings is ordered first in a sort performed according to said locale-specific sort order by comparing the order in said table of the respective entries; and in response to said determining step, specifying which one-to-two character is ordered first in a sort performed according to said locale-specific sort order.

8. The method of claim 7, wherein the respective entry for the first one-to-two character is positioned in the table at a relative location before the respective entry for the second one-to-two character, so that said specifying step specifies that said first one-to-two character is ordered before said second one-to-two character in a sort performed according to said locale-specific sort order.

9. The method of claim 7, wherein the respective entry for the second one-to-two character is positioned in the table at a relative location after the respective entry for the second one-to-two character, so that said specifying step specifies that said first one-to-two character is ordered after said second one-to-two character in a sort performed according to said locale-specific sort order.

10. The method of claim 7, wherein said first one-to-two character comprises an "æ" character and said second one-to-two character comprises an "ä" character.

11. The method of claim 10, wherein said locale-specific sort order specifies a German DIN sort, so that the entry for said "æ" character is positioned in the table at a relative location before the entry for the "ä" character.

12. The method of claim 7, wherein each entry further stores a soft weighting flag for indicating whether occurrence of a diacritic character during comparison is accorded greater weight than expansion of a one-to-two character.

13. In a computer system for sorting text strings comprising international characters according to a locale-specific sort order, an improved method for comparing characters in text strings which sorted on the basis of character case, the method comprising:

storing a collation table comprising a plurality of character entries, each entry for a character storing primary, secondary, and tertiary collation weightings, said primary collation weighting indicating for the character a collation weighting based on character family, said secondary collation weighting indicating for the character a collation weighting based on diacritic marks, said tertiary collation weighting indicating for the character a collation weighting based on character case;

receiving a request for comparing first and second characters; and determining, based on respective entries in said table, which of said first and second characters is ordered first in a sort performed according to said locale-specific sort order by substeps comprising:
(1) if a difference in respective primary collation weightings exists, indicating that the character to be ordered first is the character with the greater primary weighting, otherwise
(2) if a difference in respective secondary collation weightings exists, indicating that the character to be ordered first is the character with the greater secondary weighting, and otherwise
(3) if a difference in respective tertiary collation weightings exists, indicating that the character to be ordered first is the character with the greater tertiary weighting.

14. The method of claim 13, further comprising:
if no primary, secondary, or tertiary weighting differences exist, indicating that said first and second characters are ordered according to natural order of said first and second characters.

15. The method of claim 13, wherein said first and second characters are, respectively, lower and upper case versions of a particular character.

16. The method of claim 15, wherein said locale-specific sort order specifies that a lower case version of a particular character is to be sorted before an upper case version of said particular character, and wherein said tertiary weighting for said lower case version of said particular character is assigned a greater weighting than said upper case version of said particular character.

17. The method of claim 15, wherein said locale-specific sort order specifies that an upper case version of a particular character is to be sorted before a lower case version of said particular character, and wherein said tertiary weighting for said upper case version of said particular character is assigned a greater weighting than said lower case version of said particular character.

18. The method of claim 13, wherein said determining step includes:
subtracting primary, secondary, or tertiary weightings for said first character from primary, secondary, or tertiary weightings of said second character, for determining a difference in corresponding weightings of said first and said second characters.

19. The method of claim 13, wherein said table further stores an ignore flag for each character, for indicating that, during comparison of text strings, weightings differences attributable to said each character are to be ignored unless said text strings are otherwise identical.

20. A system for comparing text strings comprising culturally-dependent information, the system comprising:
a computer having a processor and a memory, said memory storing a collation table and an expansion table; said collation table comprising:
a plurality of character entries, each entry for a character storing primary, secondary, and tertiary collation weightings, said primary collation weighting indicating for the character a collation weighting based on character family, said secondary collation weighting indicating for the character a collation weighting based on diacritic marks, said tertiary collation weighting indicating for the character a collation weighting based on character case;
said expansion table comprising:
a plurality of one-to-two character expansion entries, each entry storing first and second expanded characters which a given one-to-two character expands into for sorting, each entry further storing a flag for indicating whether said given one-to-two character is sorted before or after said first and second expanded characters; and
collation means for comparing text strings, said collation means including:
means for testing whether a net difference in primary collation weightings exists between text strings;
means for determining whether a character expansion for a particular character is treated as a difference in secondary weighting;
means for testing whether a net difference in secondary collation weightings exists between text strings; and
means for testing whether a net difference in tertiary collation weightings exists between text strings.

* * * * *